(12) United States Patent
Apgar et al.

(10) Patent No.: US 8,823,659 B2
(45) Date of Patent: Sep. 2, 2014

(54) METHOD AND APPARATUS FOR TOUCH PANEL

(75) Inventors: Jeffrey Allen Apgar, Escondido, CA (US); Karthik Govindhasamy, San Diego, CA (US)

(73) Assignee: Nokia Corporation, Espoo (FI)

( * ) Notice: Subject to any disclaimer, the term of this patent is extended or adjusted under 35 U.S.C. 154(b) by 329 days.

(21) Appl. No.: 13/155,126

(22) Filed: Jun. 7, 2011

(65) Prior Publication Data

US 2012/0313859 A1    Dec. 13, 2012

(51) Int. Cl.
*G06F 3/041*    (2006.01)
*H05K 1/03*     (2006.01)
*B29C 65/00*    (2006.01)
*G06F 3/044*    (2006.01)
*B32B 37/12*    (2006.01)

(52) U.S. Cl.
CPC ............... *G06F 3/044* (2013.01); *G06F 3/041* (2013.01); *B32B 37/12* (2013.01); *B32B 2457/208* (2013.01)
USPC .............................. 345/173; 174/254; 156/60

(58) Field of Classification Search
USPC ........................................................ 345/173
See application file for complete search history.

(56) References Cited

U.S. PATENT DOCUMENTS

| | | | |
|---|---|---|---|
| 7,710,406 B2 | 5/2010 | Fujii et al. | |
| 7,746,662 B2 | 6/2010 | Nakanishi et al. | |
| 7,804,491 B2 | 9/2010 | Inoue et al. | |
| 7,825,912 B2 | 11/2010 | Lee | |
| 7,864,165 B2 | 1/2011 | Weh et al. | |
| 7,868,877 B2 | 1/2011 | Pietri et al. | |
| 2004/0256147 A1* | 12/2004 | Shigetaka | 174/254 |
| 2007/0182720 A1* | 8/2007 | Fujii et al. | 345/173 |
| 2008/0165139 A1 | 7/2008 | Hotelling et al. | |
| 2009/0262095 A1 | 10/2009 | Kinoshita et al. | |
| 2010/0045912 A1 | 2/2010 | Chen et al. | |
| 2010/0060602 A1* | 3/2010 | Agari et al. | 345/173 |
| 2011/0025636 A1* | 2/2011 | Ryu et al. | 345/173 |
| 2012/0127094 A1 | 5/2012 | Jeong | |

FOREIGN PATENT DOCUMENTS

| | | |
|---|---|---|
| EP | 1450334 A1 | 8/2004 |
| JP | 2009176198 A | 8/2009 |
| KR | 100978461 B | 8/2010 |

OTHER PUBLICATIONS

"Microsoft Concept Phone Features Borderless Display, Projector, Phaser" http://www.intomobile.com/2010/05/10/microsoft-concept-phone-features-borderless-display-projector-phaser/, printed Nov. 23, 2010.

* cited by examiner

*Primary Examiner* — Charles V Hicks
(74) *Attorney, Agent, or Firm* — Harrington & Smith (57) ABSTRACT

In accordance with an example embodiment of the present invention an apparatus comprises a display having an edge and side and a first layer coupled with the display having a first portion opposing the display comprising a wiring pattern for receiving a touch signal, the first layer having a second portion extending beyond the edge and along at least a portion of the side, the second portion comprising a wiring pattern for coupling the wiring pattern for receiving a touch signal with an electronic circuit.

20 Claims, 12 Drawing Sheets

METHOD AND APPARATUS FOR TOUCH PANEL

TECHNICAL FIELD

The present application relates generally to a method and apparatus for a touch panel.

BACKGROUND

A touch panel, generally, is an electronic sensing device for detecting the presence and location of a touch signal. The term may generally refer to touching the touch panel with a finger, hand or stylus. Touch panels are common in devices such as mobile phones, tablet computers and other electronic devices.

A touch screen generally refers to a touch panel combined with an electronic visual display. A touch screen enables a user to interact directly with what is displayed rather than indirectly with a cursor controlled by a mouse, for example.

SUMMARY

Various aspects of examples of the invention are set out in the claims. According to a first aspect of the present invention, an apparatus, comprises a display having an edge and side and a first layer having a first portion opposing the display comprising a first wiring pattern for receiving a touch signal, the first layer having a second portion extending beyond the edge and along at least a portion of the side, the second portion comprising a second wiring pattern for coupling the first wiring pattern with an electronic circuit.

According to a second aspect of the present invention, an apparatus comprises a first layer having a first and second edge and a second layer having a first portion opposing the first layer comprising a first wiring pattern for receiving a touch signal, the second layer having a second portion extending beyond the first edge comprising a second wiring pattern for coupling the first wiring pattern with an electronic circuit, the second layer having a third portion extending beyond the second edge, the third portion comprising a third wiring pattern for coupling the first wiring pattern with the electronic circuit.

According to a third aspect of the present invention, a method comprising coupling a first layer to a flexible second layer using an optically transparent adhesive, the first layer having a first and second edge, the second layer having a first portion opposing the first layer comprising a first wiring pattern for receiving a touch signal, the second layer having a second portion extending beyond the first edge comprising a second wiring pattern for coupling the first wiring pattern with an electronic circuit, the second layer having a third portion extending beyond the second edge, the third portion comprising a third wiring pattern for coupling the first wiring pattern with the electronic circuit.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 7.

Figure 1:
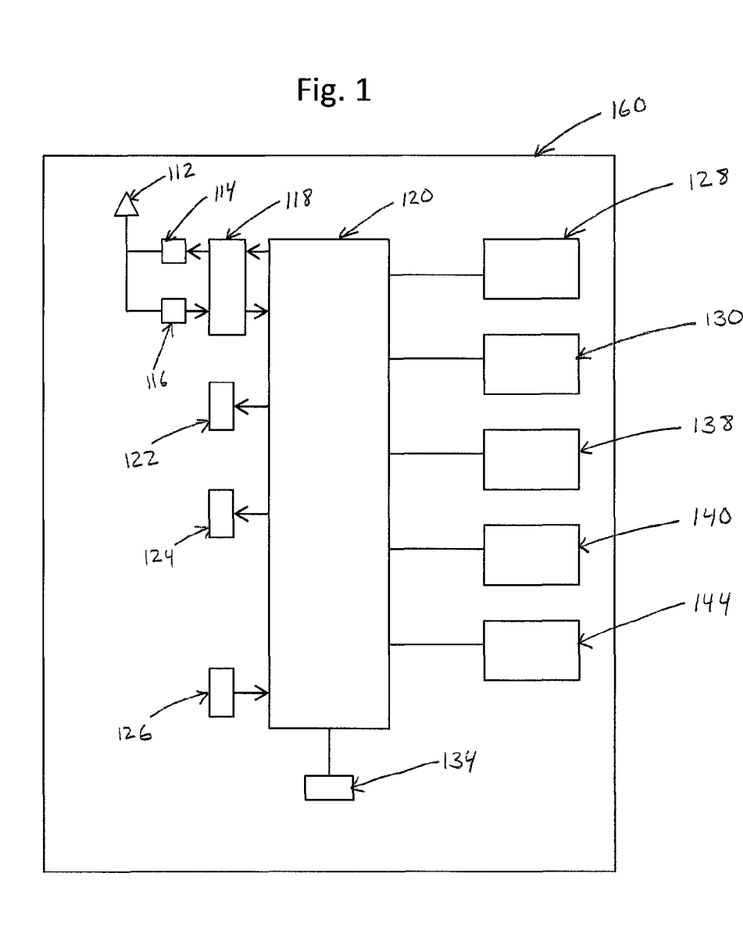
FIG. 1 is a block diagram of an apparatus according to an example embodiment of the invention.

FIG. 1 is a block diagram of an apparatus according to an example embodiment of the invention. In an embodiment, an apparatus such as apparatus 160 comprises at least one antenna 112 in communication with a transmitter 114 and a receiver 116. Transmitter 114 and/or receiver 116 are connected with a network interface such as network interface 118 for transmitting and receiving signals. The apparatus 160 comprises a processor 120 and optionally one or more other processing components. The processor 120 provides at least one signal to the transmitter 114 and receives at least one signal from the receiver 116. In an embodiment, apparatus 160 further comprises a user interface that includes one or more input and/or output devices, such as a conventional earphone or speaker 124, a ringer 122, a microphone 126, a display 128, a keypad 130 and/or the like. Input and output devices of the user interface may be coupled with processor 120. In an embodiment, the display 128 is a liquid crystal display, and/or the like. Keypad 130 may be used to compose text communications and provide other user input to apparatus 160. In an embodiment, apparatus 160 further comprises a touch panel 144 coupled with processor 120 for receiving input from a user. In an embodiment, touch panel 144 is a touch screen.

In an example embodiment, the apparatus 160 further comprises a battery 134, such as a vibrating battery pack for powering various circuits to operate apparatus 160. In an embodiment, apparatus 160 further comprises volatile memory 138, such as random access memory (RAM). Volatile memory 138 may comprise a cache area for the temporary storage of data. Further, in an embodiment, the apparatus 160 further comprises non-volatile memory 140, which may be embedded and/or removable. The non-volatile memory 140 may also comprise an electrically erasable programmable read only memory (EEPROM), flash memory, and/or the like. In an embodiment, apparatus 160 may use memory to store any of a number of pieces of information and/or data to implement one or more features of the apparatus 160. Further, the memory may comprise an identifier, such as international mobile equipment identification (IMEI) code, capable of uniquely identifying the apparatus 160. The memory may store one or more instructions for determining cellular identification information based at least in part on the identifier. For example, the processor 120, using the stored instructions, may determine an identity, e.g., using cell identification information.

In an embodiment, processor 120 of apparatus 160 comprises circuitry for implementing one or more features of the apparatus. For example, the processor 120 may comprise at least one digital signal processor device, a microprocessor device, a digital to analog converter, other support circuits, and/or the like. Further, the processor 120 may comprise features to execute one or more software programs. For example, the processor 120 may be capable of operating a software program for connectivity, such as a conventional Internet browser. Further, the connectivity program may allow the apparatus 160 to transmit and receive Internet content, such as email messages, text messages, SMS messages, MMS messages, image data, video data, location-based content, web page content, and/or the like.

In an example embodiment, the apparatus 160 is capable of operating in accordance with any of a number of a first generation communication protocol, a second generation communication protocol, a third generation communication protocol, a fourth generation communication protocol, and/or the like. For example, the apparatus 160 may be capable of operating in accordance with second generation (2G) communication protocols IS-136, time division multiple access (TDMA), global system for mobile communication (GSM), IS-95 code division multiple access (CDMA), and/or the like. Further, the apparatus 160 may be capable of operating in accordance with third-generation (3G) communication protocols, such as Universal Mobile Telecommunications System (UMTS), CDMA2000, wideband CDMA (WCDMA), time division-synchronous CDMA (TD-SCDMA), and/or the like. Further still, the apparatus 160 may also be capable of operating in accordance with 3.9 generation (3.9G) wireless communication protocols, such as Evolved Universal Terrestrial Radio Access Network (E-UTRAN) and/or the like, or wireless communication projects, such as long term evolution (LTE) and/or the like. Still further, the apparatus 160 may be capable of operating in accordance with fourth generation (4G) communication protocols.

In an embodiment, apparatus 160 is capable of operating in accordance with a non-cellular communication mechanism. For example, apparatus 160 may be capable of communication in a wireless local area network (WLAN), other communication networks, and/or the like. Further, the apparatus 160 may communicate in accordance with techniques, such as radio frequency (RF), infrared (IrDA), any of a number of WLAN techniques. For example, the apparatus 160 may communicate using one or more of the following WLAN techniques: IEEE 802.11, e.g., 802.11a, 802.11b, 802.11g, 802.11n, and/or the like.

While embodiments of the apparatus 160 are illustrated and will be hereinafter described for purposes of example, apparatus 160 may include other modules and/or capabilities including but not limited to an electronic device such as a portable digital assistant (PDA), a pager, a mobile television, a gaming device, a video recorder, an audio player, a video player, a radio, a mobile telephone, a traditional computer, a portable computer device, a global positioning system (GPS) device, a GPS navigation device, a GPS system, a mobile computer, a browsing device, an electronic book reader, a combination thereof, and/or the like, may be used. While several embodiments of the invention may be performed or used by apparatus 160, embodiments may also be employed by a server, a service, a combination thereof, and/or the like.

Figure 2:
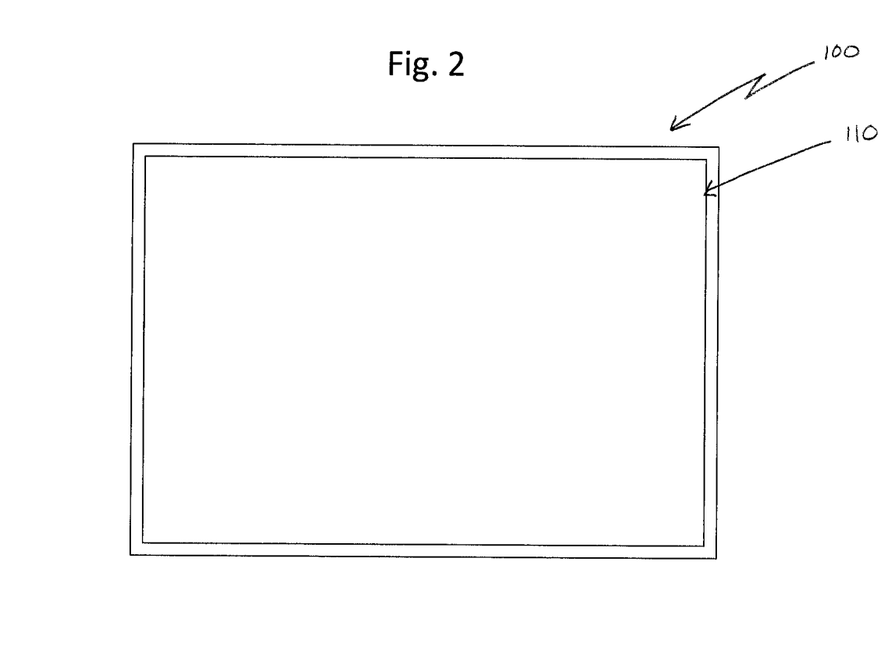
FIG. 2 is a diagram of an apparatus according to an example embodiment of the invention.

FIG. 2 is a diagram of an apparatus 100 according to an example embodiment of the invention. In an embodiment, apparatus 100 comprises a touch panel 110 for enabling a user to interact with an apparatus. In an embodiment, a touch panel is an electronic sensing device for detecting the presence and location of a touch signal. In an embodiment, a touch signal generally refers to a touch and/or proximity indication received by a touch panel from a finger, hand, stylus and/or the like. In an embodiment, touch panel 110 is a touch screen. In an embodiment, a touch screen comprises a touch panel and a display enabling a user to interact directly with what is displayed rather than indirectly with a cursor controlled by a mouse, for example. In an embodiment, apparatus 100 is apparatus 160 of FIG. 1.

Figure 3:
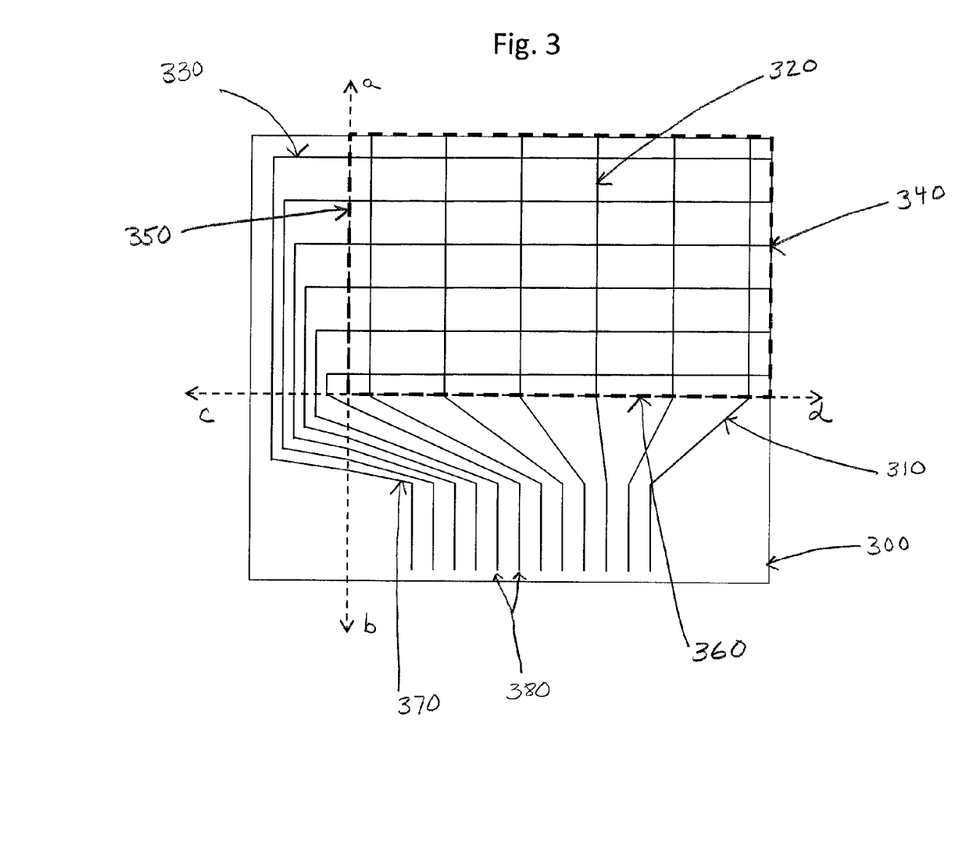
FIG. 3 is a diagram of a display and layer; the layer comprising a wiring pattern having first and second portions according to an example embodiment of the invention.

FIG. 3 is a diagram of a display 340 and layer 300; the layer 300 comprising a wiring pattern such as wiring pattern 310 having a first portion 320 and a second portion 330 according to an example embodiment of the invention. In the embodiment, display 340 comprises an edge such as edge 350 and a side such as side 450 of FIG. 4c. In an embodiment, layer 300 comprises first portion 320 of a wiring pattern 310 opposing the display 340. In an embodiment, layer 300 comprises second portion 330 of a wiring pattern 310 extending beyond an edge of display 340 such as edge 350. In an embodiment, first portion 320 of wiring pattern 310 is configured for receiving a touch signal. In an embodiment, second portion 330 of wiring pattern 310 is configured for coupling first portion 320 of wiring pattern 310 with an electronic circuit such as processor 120 of FIG. 1. In an embodiment, ends 380 of wiring pattern 310 are coupled with processor 120 of FIG. 1.

In an embodiment, a layer such as layer 300 is a flexible, optically transparent, thin, film-like material comprising at least one conductive layer made from a material such as indium tin oxide. In the embodiment, at least one wiring pattern comprising the material such as indium tin oxide is deposited onto the at least one conductive layer. In the embodiment, at least a portion of the wiring pattern such as first portion 320 is configured on the material to enable detection of a touch signal using any method known in the art including but not limited to capacitive sensing. In an embodiment, at least one portion of the wiring pattern such as second portion 330 is configured on the thin film material for coupling the at least one wiring pattern with an electronic circuit. In an embodiment, the at least one portion of the wiring pattern for coupling the at least one wiring pattern does not enable detection of a touch signal.

Figure 4A:
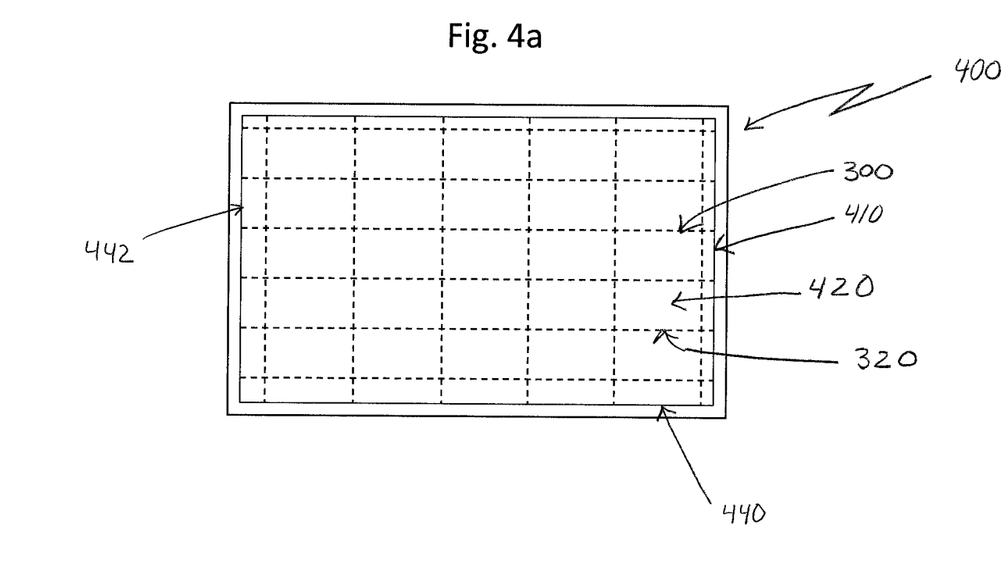
FIG. 4a is a diagram of a front view of an apparatus comprising the layer of FIG. 3 according to an example embodiment of the invention.
Figure 4B:
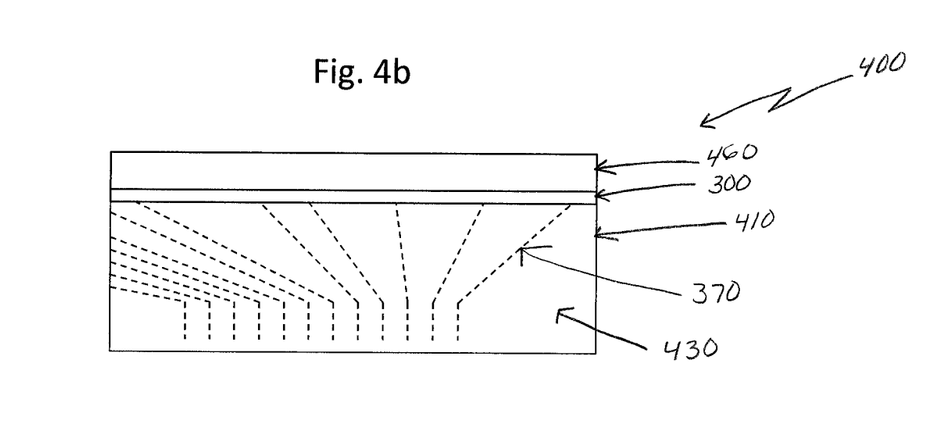
FIG. 4b is a diagram of a first side view of the apparatus of FIG. 4a according to an example embodiment of the invention.
Figure 4C:
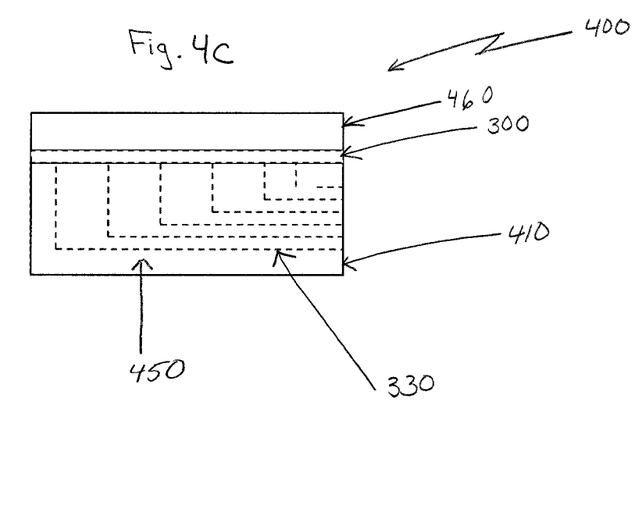
FIG. 4c is a diagram of a second side view of the apparatus of FIG. 4a according to an example embodiment of the invention.

In an embodiment, second portion 330 of layer 300 is bent at line a-b such that at least a part of second portion 330 extends along a side of display 340 such as side 450 of FIG. 4c.

In an embodiment, layer 300 comprises a third portion 370 extending beyond an edge of display 340 such as edge 360. In an embodiment, third portion 370 is configured for coupling first portion 320 of wiring pattern 310 with an electronic circuit such as processor 120 of FIG. 1. In an embodiment, third portion 370 is bent at line c-d such that at least a part of third portion 370 extends along a side of display 340 such as side 430 of FIG. 4b.

In an embodiment, first portion 320, second portion 330 and third portion 370 of wiring pattern 310 are different wiring patterns. In another embodiment, first portion 320, second portion 330 and third portion 370 of wiring pattern 310 are parts of the same wiring pattern. In an embodiment, second portion 330 of wiring pattern 310 is not touch sensitive. In an embodiment, third portion 370 of wiring pattern 310 is not touch sensitive. In an embodiment, first portion 320 of wiring pattern is flush with edge 350 of display 340. In an embodiment, first portion 320 of wiring pattern is flush with edge 360 of display 340.

In the embodiment, first portion 320, which comprises a wiring pattern for receiving a touch signal is configured to receive a touch signal substantially up to each edge of display 340 such that there is substantially no border along an edge of display 340 where a touch signal is not capable of being received.

In an embodiment, an apparatus such as apparatus 160 of FIG. 1 and apparatus 100 of FIG. 2 comprises a display such as display 340 of FIG. 3 having an edge such as edges 350 and 360 and side 430 of FIG. 4b and side 450 of FIG. 4c. In the embodiment, the apparatus further comprises a first layer having a first portion such as portion 320 opposing the display. In the embodiment, the first portion comprises a wiring pattern for receiving a touch signal. In the embodiment, the first layer has a second portion such as second portion 330 extending beyond the edge 350 and along at least a portion of the side 450 such as when first layer 300 is bent along axis a-b. In the embodiment, the second portion comprises a wiring pattern for coupling the wiring pattern for receiving a touch signal with an electronic circuit such as processor 120 of FIG. 1.

In an embodiment, an apparatus such as apparatus 160 of FIG. 1 and apparatus 100 of FIG. 2 comprises a first layer such as display 340 having first and second edges such as edges 350 and 360. In the embodiment, a second layer such as layer 300 has a first portion opposing the first layer for receiving a touch signal such as portion 320. In the embodiment, the second layer has a portion such as second portion 330 extending beyond the first edge 350 comprising a second wiring pattern for coupling the first wiring pattern with an electronic circuit. In the embodiment, the second layer has a third portion such as portion 370 extending beyond the second edge such as edge 360 wherein the third portion comprises a third wiring pattern for coupling the first wiring pattern with an electronic circuit. In an embodiment, at least one of the second and third portions is bent along at least a portion of a side of the first layer such as sides 350 and 360. In an embodiment, first portion is coupled with the first layer using an optically transparent adhesive and the second and third portions are not coupled with the first layer.

Display 340 may be any type of display including but not limited to a liquid crystal display (LCD). In an embodiment, display 340 is coupled with second layer using an optically transparent adhesive. In an embodiment, layer 300 is at least one of a touch panel and a touch pad.

FIG. 4a is a diagram of a front view of an apparatus 400 comprising the layer 300 of FIG. 3 according to an example embodiment of the invention. In an embodiment, apparatus 400 comprises a display such as display 410 and a touch panel such as touch panel 420. In an embodiment, first portion 320 of layer 300 opposes display 410. In the embodiment, first portion 320, which comprises a wiring pattern for receiving a touch signal is configured to receive a touch signal substantially up to each edge of display 410 such that there is substantially no border along an edge of display 410 where a touch signal is not capable of being received. In an embodiment, apparatus 400 is apparatus 160 of FIG. 1. In an embodiment, apparatus 400 is apparatus 100 of FIG. 2.

FIG. 4b is a diagram of a first side view of the apparatus 400 of FIG. 4a according to an example embodiment of the invention. In an embodiment, portion 370 of layer 300 is bent across edge 440 of display 410 and extends along side 430 of display 410. In an embodiment, portion 370 of wiring pattern 310 is for coupling portion 320 with an electronic circuit such as processor 120 of FIG. 1. In an embodiment, portion 370 is not capable of receiving a touch signal. In an embodiment, apparatus 400 comprises a layer 460 coupled with layer 300 comprising at least one of glass, acrylic resin and polycarbonate resin.

FIG. 4c is a diagram of a second side view of the apparatus 400 of FIG. 4a according to an example embodiment of the invention. In an embodiment, portion 330 of layer 300 is bent across edge 442 of display 410 and extends along side 450 of display 410. In an embodiment, portion 330 of wiring pattern 310 is for coupling portion 320 with an electronic circuit such as processor 120 of FIG. 1. In an embodiment, portion 330 is not capable of receiving a touch signal.

Figure 5:
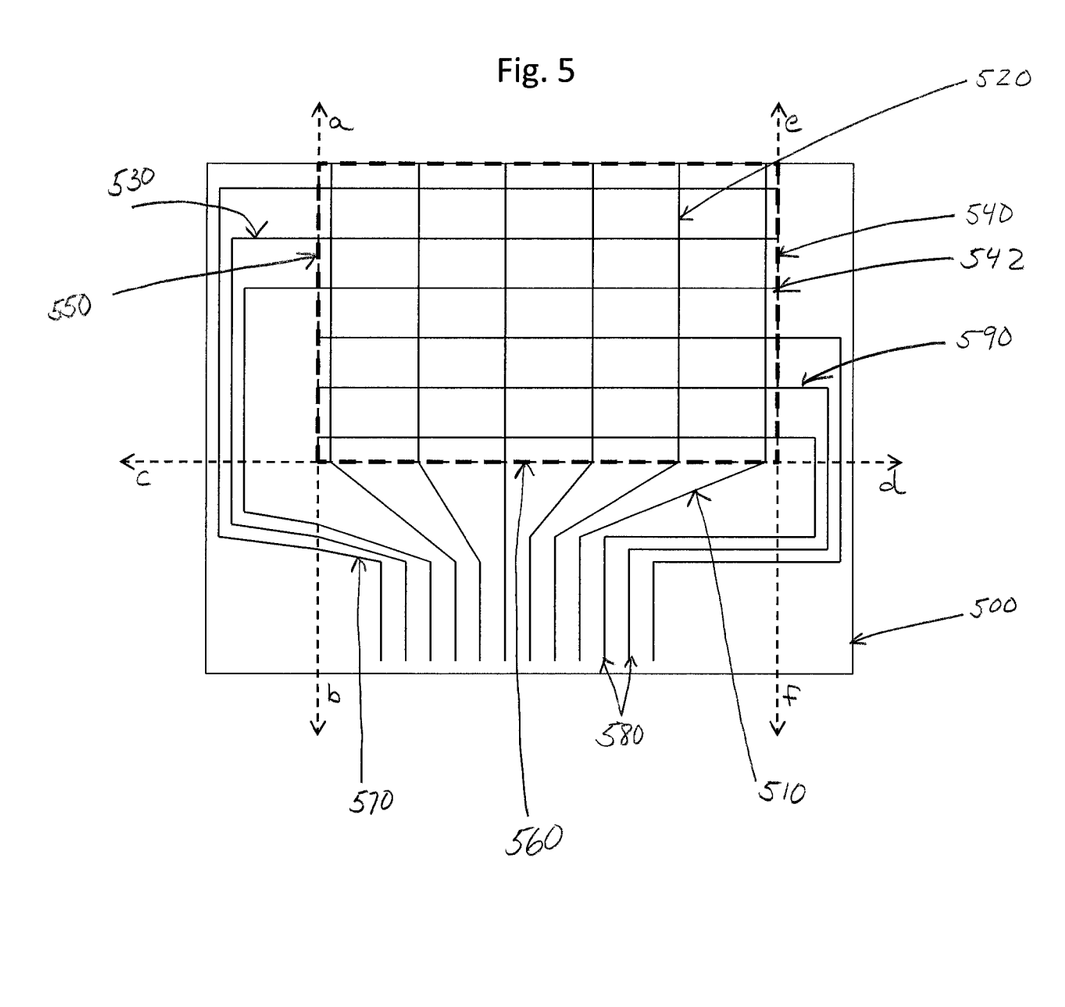
FIG. 5 is a diagram of a display and layer comprising a wiring pattern having a first portion, second portion and third portion according to an example embodiment of the invention.

FIG. 5 is a diagram of a display 540 and layer 500 comprising a wiring pattern having a first portion 520, second portion 530 and third portion 590 according to an example embodiment of the invention. In the embodiment, display 540 comprises an edge such as edge 550 and a side 650 of FIG. 6c. In an embodiment, layer 500 comprises first portion 520 of a wiring pattern 510 opposing the display 540. In an embodiment, layer 500 comprises second portion 530 of a wiring pattern 510 extending beyond an edge of display 540 such as edge 550. In an embodiment, first portion 520 of wiring pattern 510 is configured for receiving a touch signal. In an embodiment, second portion 530 of wiring pattern 510 is configured for coupling first portion 520 of wiring pattern 510 with an electronic circuit such as processor 120 of FIG. 1. In an embodiment, ends 580 of wiring pattern 510 are coupled with processor 120 of FIG. 1.

In an embodiment, a layer such as layer 500 is a flexible, optically transparent, thin, film-like material comprising at least one conductive layer made from a material such as indium tin oxide. In the embodiment, at least one wiring pattern comprising the material such as indium tin oxide is deposited onto the at least one conductive layer. In an embodiment, at least a portion of the wiring pattern such as first portion 520 is configured on the material to enable detection of a touch signal using any method known in the art including but not limited to capacitive sensing. In an embodiment, at least one portion of the wiring pattern such as second portion 530 is configured on the thin film material for coupling the at least one wiring pattern with an electronic circuit. In an embodiment, the at least one portion of the wiring pattern for coupling the at least one wiring pattern does not enable detection of a touch signal.

Figure 6A:
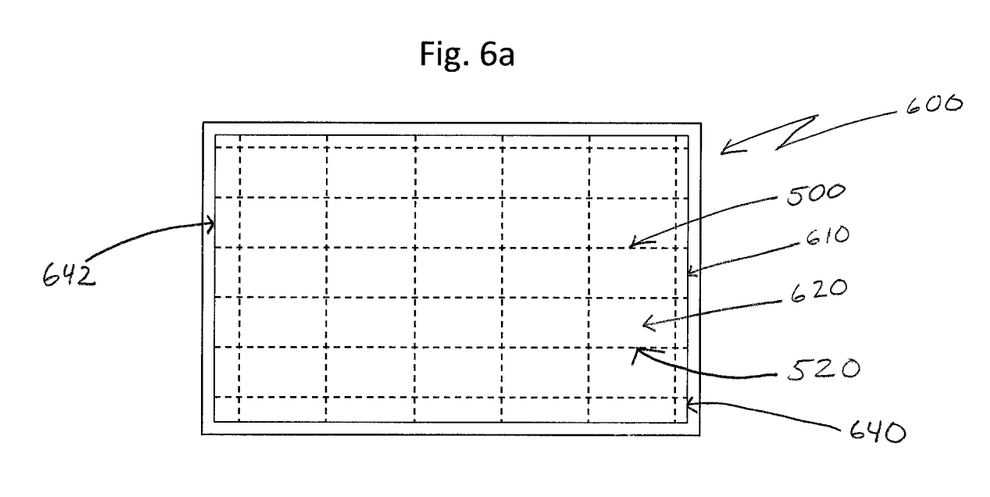
FIG. 6a is a diagram of a front view of an apparatus comprising the layer of FIG. 5 according to an example embodiment of the invention.
Figure 6B:
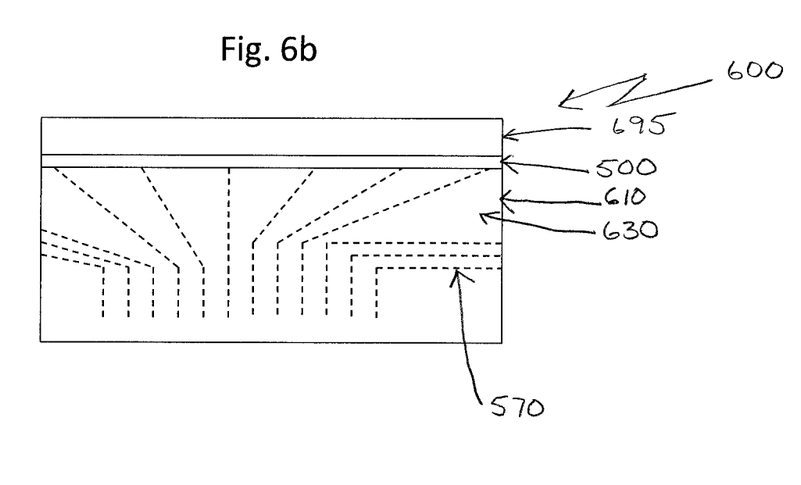
FIG. 6b is a diagram of a first side view of the apparatus of FIG. 6a according to an example embodiment of the invention.
Figure 6C:
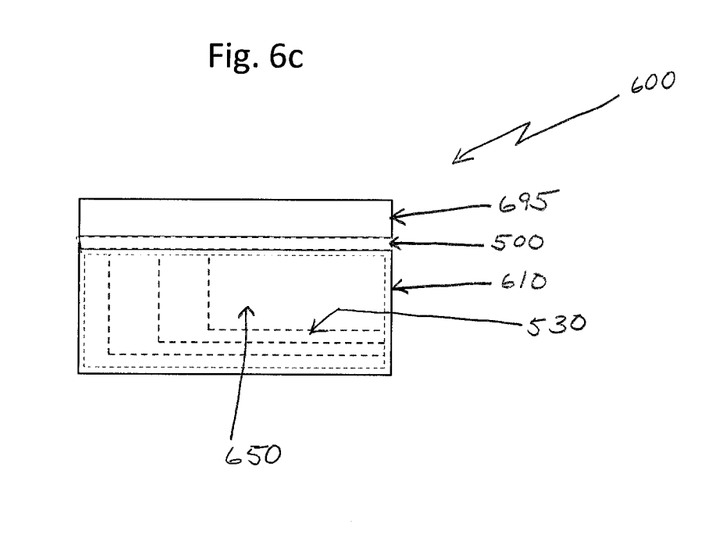
FIG. 6c is a diagram of a second side view of an apparatus of FIG. 6a according to an example embodiment of the invention.
Figure 6D:
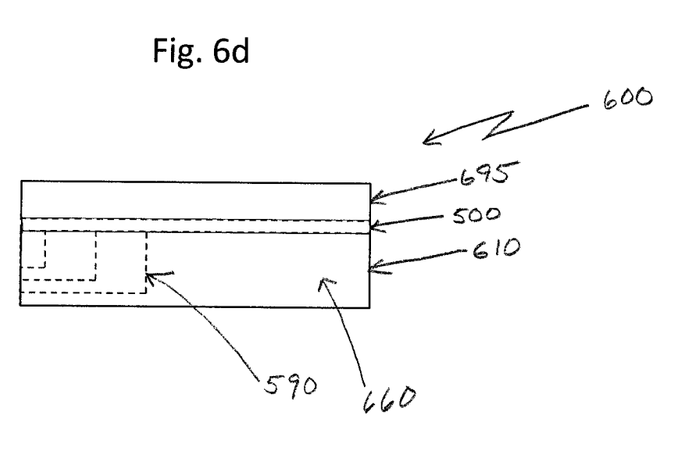
FIG. 6d is a diagram of a third side view of the apparatus of FIG. 6a according to an example embodiment of the invention.

In an embodiment, second portion 530 of layer 500 is bent at line a-b such that at least a part of second portion 530 extends along a side of display 540 such as side 650 of FIG. 6d.

In an embodiment, layer 500 comprises a third portion 590 extending beyond an edge of display 540 such as edge 542. In an embodiment, third portion 590 is configured for coupling first portion 520 of wiring pattern 510 with an electronic circuit such as processor 120 of FIG. 1. In an embodiment, third portion 590 is bent at line e-f such that at least a part of third portion 590 extends along a side of display 540 such as side 660 of FIG. 6d.

In an embodiment, first portion 520, second portion 530 and third portion 590 of wiring pattern 510 are different wiring patterns. In another embodiment, first portion 520, second portion 530 and third portion 590 of wiring pattern 510 are parts of the same wiring pattern. In an embodiment, second portion 530 of wiring pattern 510 is not touch sensitive. In an embodiment, third portion 590 of wiring pattern 510 is not touch sensitive. In an embodiment, first portion 520 of wiring pattern is flush with edge 550 of display 540. In an embodiment, first portion 520 of wiring pattern is flush with edge 560 of display 540.

In the embodiment, first portion 520, which comprises a wiring pattern for receiving a touch signal is configured to receive a touch signal substantially up to each edge of display 540 such that there is substantially no border along an edge of display 540 where a touch signal is not capable of being received.

In an embodiment, an apparatus such as apparatus 160 of FIG. 1 and apparatus 100 of FIG. 2 comprises a display such as display 540 having an edge such as edges 550, 542 and 590 and sides 630, 650 and 660. In the embodiment, the apparatus further comprises a first layer having a first portion such as portion 520 opposing the display. In the embodiment, the first portion comprises a wiring pattern for receiving a touch signal. In the embodiment, the first layer has a second portion such as second portion 530 extending beyond the edge 550 and along at least a portion of the side such as when first layer 500 is bent along axis a-b. In the embodiment, the second portion comprises a wiring pattern for coupling the wiring pattern for receiving a touch signal with an electronic circuit such as processor 120 of FIG. 1.

In an embodiment, an apparatus such as apparatus 160 of FIG. 1 and apparatus 100 of FIG. 2 comprises a first layer such as display 540 having first and second edges such as edges 550 and 542. In the embodiment, a second layer such as layer 500 has a first portion opposing the first layer for receiving a touch signal such as portion 520. In the embodiment, the second layer has a portion such as second portion 530 extending beyond the first edge 550 comprising a second wiring pattern for coupling the first wiring pattern with an electronic circuit. In the embodiment, the second layer has a third portion such as portion 590 extending beyond the second edge such as edge 542 wherein the third portion comprises a third wiring pattern for coupling the first wiring pattern with an electronic circuit. In an embodiment, at least one of the second and third portions is bent along at least a portion of a side of the first layer such as sides 650 and 660. In an embodiment, first portion is coupled with the first layer using an optically transparent adhesive and the second and third portions are not coupled with the first layer.

Display 540 may be any type of display including but not limited to a liquid crystal display (LCD). In an embodiment, display 540 is coupled with the second layer using optically transparent adhesive. In an embodiment, layer 300 is at least one of a touch panel and a touch pad.

FIG. 6a is a diagram of a front view of apparatus 600 comprising the layer 500 of FIG. 5 according to an example embodiment of the invention. In an embodiment, apparatus 600 comprises a display such as display 610 and a touch panel such as touch panel 620. In an embodiment, first portion 620 of layer 500 opposes display 610. In the embodiment, first portion 620, which comprises a wiring pattern for receiving a touch signal is configured to receive a touch signal substantially up to each edge of display 610 such that there is substantially no border along an edge of display 610 where a touch signal is not capable of being received. In an embodiment, apparatus 600 is apparatus 160 of FIG. 1. In an embodiment, apparatus 600 is apparatus 100 of FIG. 2.

FIG. 6b is a diagram of a first side view of the apparatus 600 of FIG. 6a according to an example embodiment of the invention. In an embodiment, portion 570 of layer 500 is bent across edge 560 of display 410 and extends along side 630 of display 610. In an embodiment, portion 570 of wiring pattern 510 is for coupling portion 520 with an electronic circuit such as processor 120 of FIG. 1. In an embodiment, portion 570 is not capable of receiving a touch signal. In an embodiment, apparatus 600 comprises a layer 695 coupled with layer 500 comprising at least one of glass, acrylic resin and polycarbonate resin.

FIG. 6c is a diagram of a second side view of the apparatus 600 of FIG. 6a according to an example embodiment of the invention. In an embodiment, portion 530 of layer 500 is bent across edge 642 of display 610 and extends along side 650 of display 610. In an embodiment, portion 530 of wiring pattern 510 is for coupling portion 520 with an electronic circuit such as processor 120 of FIG. 1. In an embodiment, portion 530 is not capable of receiving a touch signal.

FIG. 6d is a diagram of a third side view of the apparatus 600 of FIG. 6a according to an example embodiment of the invention. In an embodiment, portion 590 of layer 500 is bent across edge 542 of display 610 and extends along side 660 of display 610. In an embodiment, portion 590 of wiring pattern 510 is for coupling portion 520 with an electronic circuit such as processor 120 of FIG. 1. In an embodiment, portion 590 is not capable of receiving a touch signal.

Figure 7:
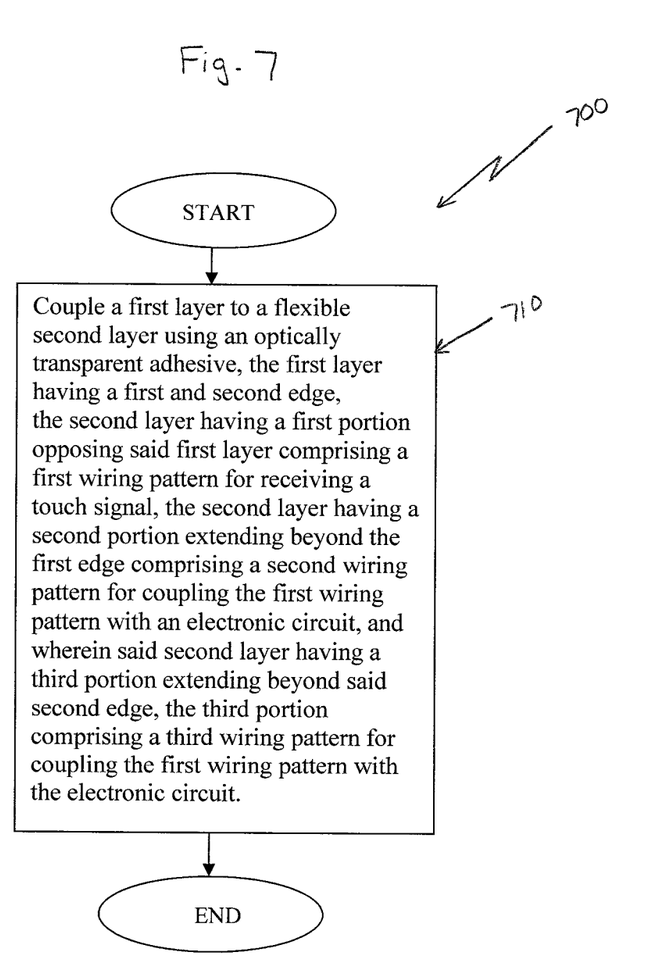
FIG. 7 is a flow diagram illustrating a method according to an example embodiment of the invention.

FIG. 7 is a flow diagram illustrating a method 700 according to an example embodiment of the invention. In an embodiment, at 710, a method 700 comprises coupling a first layer with a flexible second layer using an optically transparent adhesive, the first layer has a first edge such as edge 350 of FIG. 3 and second edge such as edge 360 of FIG. 3.

In an embodiment, the first layer is a display such as display 340 of FIG. 3. Display 340 may be any type of display including but not limited to a liquid crystal display (LCD). In the embodiment, the flexible second layer is layer 300 of FIG. 3.

In the embodiment, the second layer has a first portion such as portion 320 of FIG. 3 opposing the first layer, the second layer comprises a first wiring pattern such as wiring pattern 320 for receiving a touch signal, the second layer has a second portion such as portion 330 of FIG. 3 extending beyond the first edge comprising a second wiring pattern such as wiring pattern 330 for coupling the first wiring pattern with an electronic circuit. In the embodiment, the second layer has a third portion 370 extending beyond the second edge 360, the third portion comprising a third wiring pattern 370 for coupling the first wiring pattern with the electronic circuit.

Without in any way limiting the scope, interpretation, or application of the claims appearing below, a technical effect of one or more of the example embodiments disclosed herein is a touch screen designed to receive a touch signal substantially up to each edge of a display such that there is substantially no border along an edge of display where a touch signal is not capable of being received. Another technical effect of one or more of the example embodiments disclosed herein is a touch panel with an active touch sensitive area extending out to each edge of the touch panel such that there is substantially no border of the touch panel incapable of receiving a touch signal. Another technical effect of one or more of the example embodiments disclosed herein is a novel method of achieving a substantially borderless touch screen and/or touch panel.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising: a display having an edge and side; and a first layer coupled with the display having a first portion opposing a top surface of said display and terminating at the edge thereof and comprising a wiring pattern for receiving a touch signal, said first layer having a second portion bent over the edge and covering at least a portion of said side, said second portion comprising a different wiring pattern for coupling said wiring pattern for receiving a touch signal with an electronic circuit.

2. An apparatus according to claim 1, further comprising a second layer having a surface opposing said first portion wherein said second layer is coupled with said first layer.

3. An apparatus according to claim 2, wherein said first layer is coupled with said second layer using an optically transparent adhesive.

4. An apparatus according to claim 2, wherein said first layer is substantially flexible and optically transparent and said second layer is substantially optically transparent.

5. An apparatus according to claim 2, wherein said second layer comprises at least one of glass, acrylic resin and polycarbonate resin.

6. An apparatus according to claim 1, wherein said wiring pattern for receiving a touch signal is an extension of said wiring pattern for coupling said wiring pattern for receiving a touch signal with an electronic circuit.

7. An apparatus according to claim 1, wherein said first layer comprises indium tin oxide.

8. An apparatus according to claim 1, wherein said second portion is not touch sensitive.

9. An apparatus according to claim 1, wherein at least a portion of said wiring pattern for receiving a touch signal is substantially flush with said edge.

10. An apparatus according to claim 1, wherein said display having another edge and another side and wherein said first layer having a third portion bent over the another edge thereby covering at least a portion of said another side, said third portion comprising another different wiring pattern for coupling said wiring pattern for receiving a touch signal with said electronic circuit.

11. An apparatus, comprising: a first layer having a first and second edge; and a second layer having a first portion opposing said first layer comprising a first wiring pattern for receiving a touch signal, said second layer having a second portion bent over said first edge comprising a different second wiring pattern for coupling said first wiring pattern with an electronic circuit, wherein said second layer having a third portion bent over said second edge, said third portion comprising a different third wiring pattern for coupling said first wiring pattern with said electronic circuit.

12. An apparatus according to claim 11, wherein at least one of said second and third portions covers at least a portion of a side of said first layer.

13. An apparatus according to claim 11, wherein said first portion is coupled with said first layer using an optically transparent adhesive and said second and third portions are not opposed to said first layer.

14. An apparatus according to claim 11, wherein said second layer is substantially flexible and optically transparent and said first layer is substantially optically transparent.

15. An apparatus according to claim 11, wherein said first layer comprises at least one of glass, acrylic resin and polycarbonate resin.

16. An apparatus according to claim 11, wherein said first wiring pattern is an extension of said second wiring pattern.

17. An apparatus according to claim 11, wherein said first layer comprises indium tin oxide.

18. An apparatus according to claim 11, wherein said second and third portions are not capable of receiving a touch signal.

19. An apparatus according to claim 11, wherein at least a portion of said first wiring pattern is substantially flush with said edge.

20. A method, comprising: coupling a first layer with a flexible second layer using an optically transparent adhesive, said first layer having a first and second edge, wherein said second layer having a first portion opposing said first layer comprising a first wiring pattern for receiving a touch signal, bending the second portion of the second layer over said first edge, said second layer having a second portion bent over said first edge comprising a different second wiring pattern for coupling said first wiring pattern with an electronic circuit, and wherein said second layer having a third portion bent over said second edge, said third portion comprising a different third wiring pattern for coupling said first wiring pattern with said electronic circuit.

* * * * *